(12) United States Patent
Lim

(10) Patent No.: US 7,221,674 B2
(45) Date of Patent: May 22, 2007

(54) METHOD AND SYSTEM FOR MULTICASTING AND BROADCASTING IP PACKET IN MOBILE COMMUNICATION SYSTEM, AND TERMINAL THEREOF

(75) Inventor: Byung Keun Lim, Gyunggi-do (KR)

(73) Assignee: LG Electronics Inc., Seoul (KR)

( * ) Notice: Subject to any disclaimer, the term of this patent is extended or adjusted under 35 U.S.C. 154(b) by 889 days.

(21) Appl. No.: 09/987,703

(22) Filed: Nov. 15, 2001

(65) Prior Publication Data

US 2002/0057662 A1 May 16, 2002

(30) Foreign Application Priority Data

Nov. 15, 2000 (KR) ................. 2000-67661

(51) Int. Cl.
*H04L 12/28* (2006.01)
*H04L 12/56* (2006.01)
(52) U.S. Cl. .............. 370/390; 370/254; 370/334; 370/336; 370/400; 370/401; 370/404; 370/470; 370/471; 455/433; 455/435.1; 455/436; 455/439; 455/440; 455/442
(58) Field of Classification Search ........... 370/352, 370/392, 395.52, 470, 471
See application file for complete search history.

(56) References Cited

U.S. PATENT DOCUMENTS

| | | | | |
|---|---|---|---|---|
| 5,786,771 | A * | 7/1998 | Feeney et al. | 370/388 |
| 6,693,896 | B1 * | 2/2004 | Utsumi et al. | 370/352 |
| 6,850,494 | B1 * | 2/2005 | Bender | 370/254 |
| 6,876,640 | B1 * | 4/2005 | Bertrand et al. | 370/331 |

* cited by examiner

*Primary Examiner*—Chi Pham
*Assistant Examiner*—Raj Jain
(74) *Attorney, Agent, or Firm*—Ked & Associates, LLP

(57) ABSTRACT

A method for multicasting/broadcasting IP data in a mobile communication system, includes the steps of a packet data serving node (PDSN) receiving multicast packet data, transforming the multicast packet data to a PPP frame format having an identification header, transmitting multicast message to base station controller/packet control function (BSC/PCF), the BSC/PCF transmitting multicasting/broadcasting message to all or some of base stations under control of the BSC/PCF according to header information of the multicast message, and transmitting the multicasting/broadcasting message to mobile station through broadcasting channel.

13 Claims, 2 Drawing Sheets

METHOD AND SYSTEM FOR MULTICASTING AND BROADCASTING IP PACKET IN MOBILE COMMUNICATION SYSTEM, AND TERMINAL THEREOF

BACKGROUND OF THE INVENTION (a) Field of the Invention

The present invention relates to a mobile communication, and in particular, to a method and system for multicasting and broadcasting IP (Internet Protocol) data in mobile communication system, and a terminal thereof.

(b) Description of the Related Art

IMT-2000 supports voice and data communication using wireless packet switching and global roaming services as well as conventional circuit switching. With the IMT-2000 recommendations is complete the 3G (third generation) standardization processes are coming to closure by the 3GPP (Third Generation Partnership Project) concentrated on the DS-WCDMA (UMTS: Universal Mobile Telecommunications Systems) technology and the 3GPP2 based on the MC-WCDMA (CDMA 2000) technology. There has been much researches and studies on 3G mobile communication network and data transmission technologies such as WCDMA in wireless network and GPRS/mobile IP in the core network etc. for providing stable packet data service with enhanced QoS for voice and data transmission.

FIG. 1 is a schematic view showing a present mobile communication network for IP packet data service.

As shown in FIG. 1, the conventional mobile communication network includes servers 102 and router 104 as parts of the Internet; a carrier intranet having a Home Agent (HA) 108 working as a gateway for mobile IP users accessing to the Internet, an AAA (Authentication, Authorization, and Accounting) server 110 for authenticating, authorizing, and accounting the users; packet data serving nodes (PDSN) 202 for providing interface between a Radio Access Network (RAN) 200 and DCN; Base Station Controller (BCN) providing PPP link for data transmission and managing resources; Packet Control Function (PCF) 204 for packet access service; Base Transmission Station (BTS) 206 for call processing of mobile stations; mobile stations 208 for receiving broadcasting messages from the base station through the PPP links; and Mobile Service Switching Center (MSC)/Visitor Location Register (VLR) 112.

The operation of the packet data access service in the above structured mobile communication network will be described hereinafter.

The mobile communication network is coupled to the Internet 100 and includes PDSN1 and PDSN2 202 for providing the packet data service, the MSC/VLR 112 for providing outer network access service, the base station system (BSS), and the mobile stations 208, the BSS including the BSCs/PCF 204 for controlling Radio resources and the BTS 206.

The MSC/VLR 112 controls mobility of the mobile stations 208, connection call, radio resource allocation, wired network connection through the BSS and communicates the PSTN/PCS/PLMN networks 116 and the HLR/AUC.

The PSDN 202 provides interface functions between the RAN 200 and DCN. That is, the PSDN 202 is a data link layer termination point and performs routing with higher layer protocols.

The PSDN 202 multicasts (transmits same packets to specific nodes at the same subnets) or broadcasts (transmits the same packets to all the nodes) packets to the mobile stations.

In this mobile communication network, a mobile computing device such as a notebook and wireless data communication supportable mobile communication terminal are required for the Internet packet data access service. The mobile computing device and the mobile communication terminal are connected using a cable through serial ports provided at the devices. After the physical connection, wireless data communication can be performed only by installing communication application and setting for connection establishment.

The mobile station 208 is wirelessly connected to the BTS 206 for packet service such that the BTS 206 establishes radio link between the BSC/PCFs and is connected to the PDSN 202. Accordingly, a PPP (Point to Point Protocol) link is established between the mobile station 208 and the PDSN 202.

In this case, the IP packet data from the server 102 and router 104 as parts of the Internet 100 are transmitted to the carrier intranet 106, and the carrier intranet 106 functions takes roles for providing the gateway for the mobile IP users and authenticating, authorizing, and accounting the users, with the HA 108 and AAA server 110.

The PDSNs 202 receives multicasting/broadcasting IP datagrams or messages from the Internet 100 and transmits the IP datagrams to the corresponding mobile stations through the PPP links established there between.

The mobile station 208 receives the IP datagrams through the established PPP link.

In more detail, the mobile station 208 separately establishes PPP links with base station-base station controller/packet controller-packet data serving node so as to receive multicasting/broadcasting IP datagrams or messages through the PDSN 202.

In this case, a plurality of PPP channels for respective mobile stations 208 are assigned so as to communicate the PDSN 202 such that much resources are required for multicasting/broadcasting the same messages.

When the multicasting data received from the Internet is broadcasted to all the mobile stations or multicasted to a specific group of mobile stations, the corresponding mobile stations occupy traffic channels. In view of the mobile communication network, since the radio channels are shared by all the mobile stations, this is not the multicasting but respective channel occupancies. This causes radio resources waste and the resources required for the wired BTS-BSC/PCF-PDSN connections are used in proportional with the number of the connected mobile stations, resulting in inefficient multicasting message transmission.

SUMMARY OF THE INVENTION

The present invention has been made in an effort to solve the above problems of the prior art.

It is an object of the present invention to provide an IP data multicasting/broadcasting method allowing the PDSN to transmit the multicast messages to the mobile stations through a TCP (transmission control protocol) or UDP (User Datagram Protocol) port.

It is another object of the present invention to provide an IP data multicasting/broadcasting method allowing the PDSN to encapsulate IP data in the PPP frame together with a multicasting/broadcasting identifier at the frame header.

To achieve the above object, a method for multicasting/broadcasting IP data in a mobile communication system of the present invention, comprises the steps of a packet data serving node (PDSN) receiving multicast packet data, transforming the multicast packet data to a PPP frame format having an identification header, transmitting multicast message to base station controller/packet control function (BSC/PCF), the BSC/PCF transmitting multicasting/broadcasting message to all or some of base stations under control of the BSC/PCF according to header information of the multicast message; and transmitting the multicasting/broadcasting message to mobile station through broadcasting channel.

It is preferred that the method further comprises the steps of transforming data in the received multicast message to multicast frame data and adding IP packet header to the multicast frame data.

It is preferred that the PSDN and a host add multicasting/broadcasting identification header for multicasting/broadcasting to a terminal receiving services under IMT-2000, PCS, and cellular systems.

It is preferred that the mobile station receives the multicast PPP datagram and passes the data to the higher PPP link or IP layer.

It is preferred that the PPP link frame data transmitted from the PDSN to the mobile station has a protocol identifier for identifying multicast frame data at a higher PPP layer in the mobile station.

Also, a communication between a host and GGSN of GSM/GPRS/UTMS network is performed using a multicasting identification header through TCP/UDP port, and a communication between the GGSN and SGSN is performed using a multicasting identification header through the TCP/UDP port.

A mobile communication system for muiticasting/broadcasting IP data according to the present invention, comprises at least one packet data serving node (PDSN) for altering a received multicast packet data into PPP frame format and transmitting the PPP frame format through TCP/UDP port, at least one base station controller/packet control function (BSC/PCF) for transmitting multicasting/broadcasting message to all or some of base station under control according to header information of the multicast message received from the PDSN, at least one base station for transmitting the multicasting/broadcasting message received from the BSC/PCF to the mobile station through broadcasting channel.

A mobile terminal for multicasting/broadcasting IP data in a mobile communication system of the present invention, the mobile station receives multicast/broadcast, having multicasting/broadcasting identification header, transmitted from higher packet data serving node (PDSN), base station controller/packet control function (BSC/PCF), and base station.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
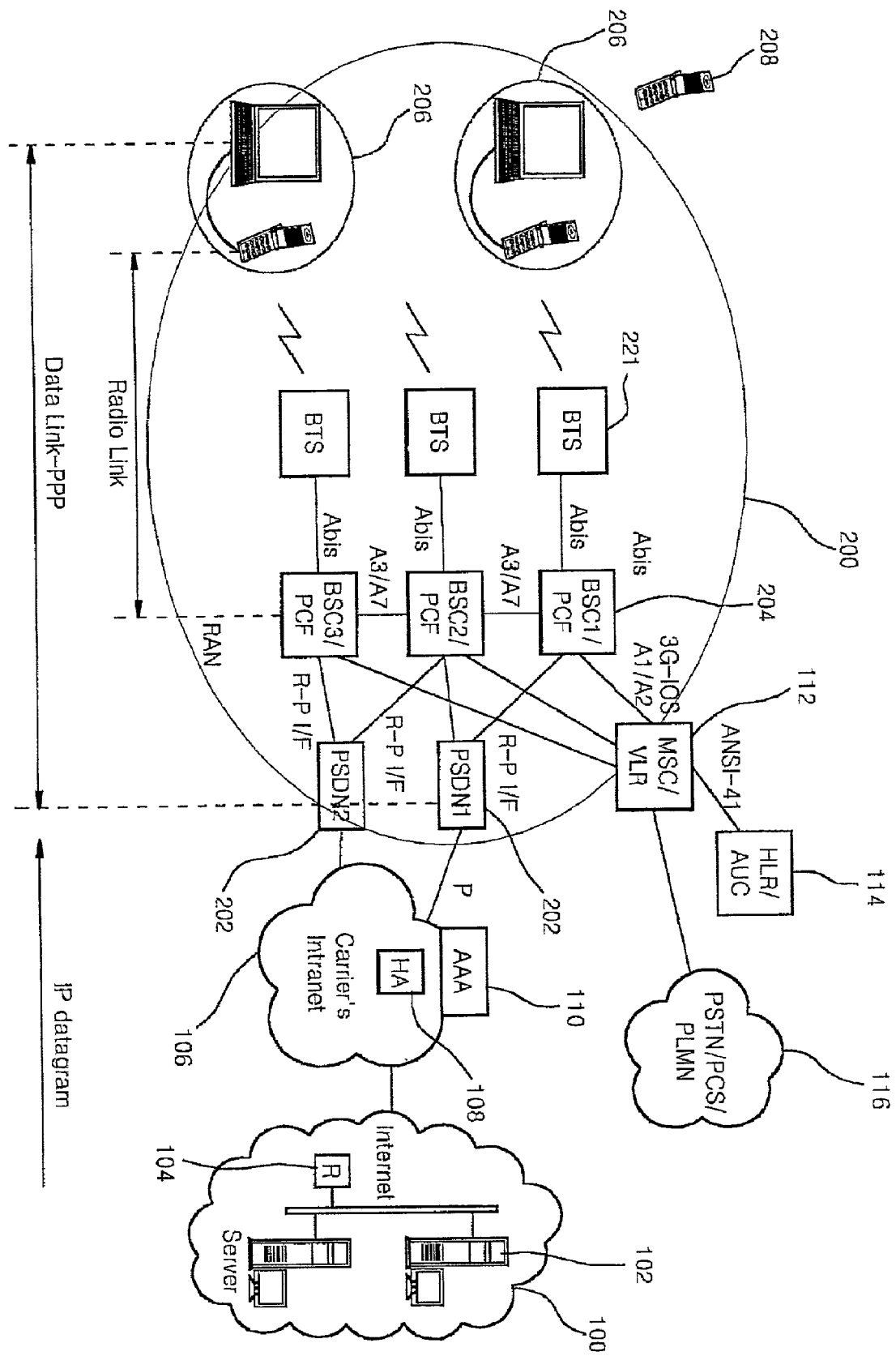
FIG. 1 is a schematic view showing a mobile communication network for a IP packet data access service.
Figure 2:
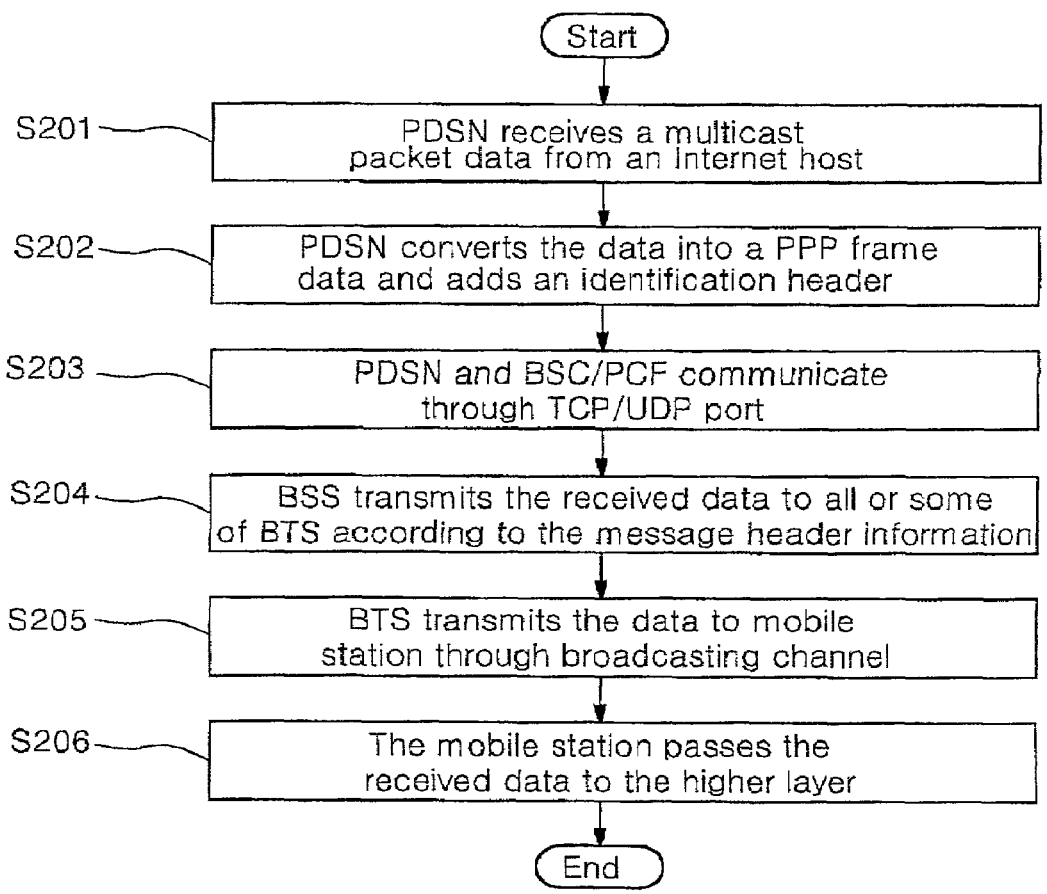
FIG. 2 is a flowchart illustrating a method for multicasting/broadcasting IP data according to a preferred embodiment of the present invention.
Figure 3:
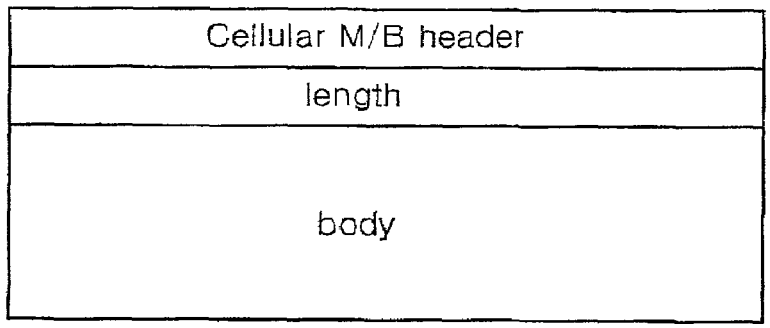
FIG. 3 is a drawing illustrating a frame format used in the IP data multicasting/broadcasting method of FIG. 2.

As shown in FIG. 1 to FIG. 3, the packet data serving node (PDSN) 202 receives multicasting IP datagram of which destinations are mobile subscriber terminals from a host resided in the Internet 100 as well as data through a multicast backbone.

The PDSN 202 receives multicasting (M/B: multicasting/broadcasting) datagram from the host (server) and router 104 located in the Internet 100 or broadcasting IP datagram through the multicast backbone at step S201.

Once receiving the datagram, the PDSN 202 encapsulates the datagram in a frame and attaches a protocol ID in the PPP frame header as an identifier for indicating whether the packet is for multicasting or broadcasting at step S202.

The frame header informs attributes about the data in data field such as QoS, data type, multicasting/broadcasting group.

As shown in FIG. 3, the IP multicast data format comprises a multicasting/broadcasting header (Cellular M/B Header), a length field indicating the length of the data, and data field.

The PDSN 202 transmits the multicast message to the BSC/PCF 204 through the TCP or UDP port at step S203.

There are two kinds of transport layer protocols, i.e., TCP (Transmission Control Protocol) and UDP (User Datagram Protocol), in the TCP/IP stack. UDP is used for an application directly transmitting data using a UDP datagram and is not a stream-oriented protocol such as TCP where the amount of data written by an application may have little relationship to what actually gets sent in a single IP datagram.

UDP header consists of source and destination port number fields, UDP length field, and UDP checksum field, and the port numbers identify the sending process and the receiving process of services or higher layer protocols in the host having an IP address.

Consequently, the BSC/PCF 204 produces a multicast request message to be transmitted to the BTS 206 on the basis of the header information of the multicast data frame received from the PDSN 202 and sends the data in message data at step S204.

The BTS 206 receives the multicast request message from the BSC 204 and transmits the multicast data to the mobile station 208 through the broadcasting channel according to the header information of the message at step S205, and the mobile station 208 receives the multicast PPP frame and sends the same to the higher PPP layer or IP layer at step S206.

When the multicast message is shown in R-P link of the Radio Access Network (RAN), the PDSN 202 transmits the multicasting/broadcasting data format message using TCP/UDP port.

In this case, since PDNS 202 and the mobile station communicates using the PPP link of the data link layer, the PDNS 202 encapsulates the datagram in the PPP frame format and adds the cellular M/B Header as a protocol identifier (ID) for indicating multicasting or broadcasting.

Accordingly, regardless or the PPP link connection between the mobile station 208 and the PDSN 202, the mobile station 208 receives the PPP frame and transmits the data to the IP layer or the PPP layer.

In more detail, once the PSDN 202 connected to the Internet for providing the packet access service receives the multicast packet data from the host (server) resided in the Internet or broadcasting IP datagram from the multicast backbone, the PSDN 202 and the PCF sends the header information for identifying multicasting/broadcasting through the TCP/UDP port.

Next, the BSC/PCF 204 transmits the received multicasting/broadcasting message to the corresponding BTS 206 with the multicast request message and the BTS 206 transmits the message to the mobile station 208 according to the multicast message. The mobile station 208 sends the received multicasting/broadcasting packet to the higher PPP layer or IP layer.

In the communication channel through which the Internet packet data is transmitted to the mobile station on the bases of RAN 200 including the PDSN and base stations system (BTS/BSC/PCF), the multicasting/broadcasting message is transmitted to the BSC/PCF through the TCP/UDP port for transmitting the data to the mobile stations in the IMT-2000/PCS/Cellular systems, and then the multicasting/broadcasting message is transmitted to all or some of the base station according to the header information such that the message is transmitted to the corresponding mobile stations through the broadcasting channel.

As the above explained communication method using the multicasting/broadcasting identification header, the PDSN 202 adds the identification header to the data frame for transmitting the data to the PCF when multicasting and broadcasting to the mobile station 208 that receives services in the IMT-2000/PCS/Cellular systems between the PDSN 202 and host.

Accordingly, when the multicast packet data is transmitted to the PPP link layer regardless of the status of the PPP link between the mobile station and the PDSN on the transmission channel, the multicasting/broadcasting data can be identified using the protocol identifier.

Also, the mobile station receives the multicasting/broadcasting PPP datagram and sends the data to the higher PPP link or the IP layer.

As described above, in the present invention, the PDSN communicates with the BSC/PCF for transmitting IP multicast data through the TCP or the UDP, converts the multicast packet data into the PPP frame data together with adding the IP multicasting/broadcasting message identifier to the frame header, and transmits the data to the BSC/PCF. The BSC/PCF transmits the data received from the PDSN and identified as the IP multicast data to all or some of the mobile stations, and the mobile station sends the data received from the base station to the higher layer. Accordingly, it is possible to efficiently multicast/broadcast the internet data without waste of resources by minimizing channel occupancy of the mobile stations.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for multicasting/broadcasting IP data in a mobile communication system, comprising:
   a packet data serving node (PDSN) receiving multicast packet data;
   transforming the multicast packet data to a PPP frame format having an identification header, wherein the identification header includes information for distinguishing at least a multicast message and a broadcast message;
   transmitting multicast message from the PDSN to base station controller/packet control function (BSC/PCF);
   the BSC/PCF transmitting multicasting/broadcasting message to all or some of base stations under control of the BSC/PCF according to header information of the multicast message; and
   transmitting the multicasting/broadcasting message to mobile station through broadcasting channel,
   wherein the multicast packet data comprises a header information including QoS, multicast/broadcast type, multicast/broadcast group, and length information including body data of the PPP frame format and message body.

2. A method of claim 1 further comprising:
   transforming data in the received multicast message to multicast frame data; and
   adding IP packet header to the multicast frame data.

3. A method of claim 1 wherein the PDSN and a host add multicasting/broadcasting identification header for multicasting/broadcasting to a terminal receiving services under IMT-2000, PCS, and cellular systems.

4. A method of claim 1 wherein the mobile station receives the multicast PPP datagram and passes the data to the higher PPP link or IP layer.

5. A method of claim 1 wherein PPP link frame data transmitted from the PDSN to the mobile station has a protocol identifier for identifying multicast frame data at a higher PPP layer in the mobile station.

6. A mobile communication system for multicasting/broadcasting IP data, comprising:
   at least one packet data serving node (PDSN) for altering a received multicast packet data into PPP frame format and transmitting the PPP frame format with header information indicating multicast as a multicast message through TCP/UDP port, wherein the header information includes information for distinguishing at least a multicast message and a broadcast message;
   at least one base station controller/packet control function (BSC/PCF) for transmitting multicasting/broadcasting message to all or some of base station under control according to header information of the multicast message received from the PDSN;
   at least one base station for transmitting the multicasting/broadcasting message received from the BSC/PCF to the mobile station through broadcasting channel,
   wherein the multicast packet data comprises a header information including QoS, multicast/broadcast type, multicast/broadcast group, and length information including body data of the PPP frame format and message body.

7. A mobile communication system for multicasting/broadcasting IP data in a mobile communication system, comprising:
   a packet data serving node (PDSN);
   a mobile terminal, the mobile terminal receiving a multicast/broadcast packet, having multicasting/broadcasting identification header, transmitted from the packet data serving node,
   a base station controller/packet control function (BSC/PCF), and
   a base station, wherein the multicast/broadcast is a multicast packet data that comprises a header information including QoS, multicast/broadcast type, multicast/ broadcast group, and length information including body data of the PPP frame format and message body, and wherein the header information includes information for distinguishing at least a multicast message and a broadcast message.

8. The system of claim 7, wherein the PDSN transmits the multicast packet data to the BSC/PCF.

9. The system of claim 7, wherein the PDSN and a host add multicasting/broadcasting identification header for multicasting/broadcasting to a terminal receiving services under IMT-2000, PCS, and cellular systems.

10. The system of claim 7, wherein data in the received multicast/broadcast is transformed to multicast frame data, and adds IP packet header to the multicast frame data.

11. The mobile communication system of claim 6, wherein data in the received multicast message is transformed to multicast frame data, and an IP packet header is added to the multicast frame data.

12. The mobile communication system of claim 6, wherein the multicast packet data comprises a header information including QoS, multicast/broadcast type, multicast/ broadcast group, and length information of a message body.

13. A method for multicasting/broadcasting IP data in a mobile communication system, comprising:
  a packet data serving node (PDSN) receiving multicast packet data;
  transforming the multicast packet data to a PPP frame format having an identification header, wherein the identification header includes information for distinguishing at least a multicast message and a broadcast message;
  transmitting multicast message to base station controller/ packet control function (BSC/PCF);
  the BSC/PCF transmitting multicasting/broadcasting message to all or some of base stations under control of the BSC/PCF according to header information of the multicast message; and
  transmitting the multicasting/broadcasting message to mobile station through broadcasting channel, wherein the multicast packet data comprises a header information including QoS, multicast/broadcast type, multicast/broadcast group and length information including body data of the PPP frame format and message body.

* * * * *